(12) United States Patent
Matsumoto et al.

(10) Patent No.: US 7,461,323 B2
(45) Date of Patent: Dec. 2, 2008

(54) QUANTUM KEY DELIVERY METHOD AND COMMUNICATION DEVICE

(75) Inventors: Wataru Matsumoto, Tokyo (JP); Yodai Watanabe, Wako (JP)

(73) Assignees: Mitsubishi Denki Kabushiki Kaisha, Tokyo (JP); Riken, Saitama (JP)

( * ) Notice: Subject to any disclaimer, the term of this patent is extended or adjusted under 35 U.S.C. 154(b) by 300 days.

(21) Appl. No.: 10/547,932

(22) PCT Filed: Mar. 10, 2004

(86) PCT No.: PCT/JP2004/003111

§ 371 (c)(1), (2), (4) Date: Jun. 16, 2006

(87) PCT Pub. No.: WO2004/088915

PCT Pub. Date: Oct. 14, 2004

(65) Prior Publication Data

US 2006/0262925 A1    Nov. 23, 2006

(30) Foreign Application Priority Data

Mar. 10, 2003   (JP)   ............... 2003-063532

(51) Int. Cl.
*H03M 13/00* (2006.01)

(52) U.S. Cl. .................. 714/758; 714/780; 713/150; 713/189; 726/14

(58) Field of Classification Search ........... 714/780, 714/758; 713/150, 189; 726/14
See application file for complete search history.

(56) References Cited

U.S. PATENT DOCUMENTS

| 5,421,017 | A | * | 5/1995 | Scholz et al. | 717/170 |
| 5,528,750 | A | * | 6/1996 | Lubart et al. | 714/15 |
| 6,460,178 | B1 | * | 10/2002 | Chan et al. | 717/147 |
| 6,804,816 | B1 | * | 10/2004 | Liu et al. | 719/311 |
| 2001/0055389 | A1 | * | 12/2001 | Hughes et al. | 380/44 |
| 2004/0190719 | A1 | * | 9/2004 | Lo | 380/255 |
| 2005/0135620 | A1 | * | 6/2005 | Kastella et al. | 380/256 |
| 2006/0059403 | A1 | * | 3/2006 | Watanabe | 714/758 |

OTHER PUBLICATIONS

Terumasa Watanabe et al., The 2003 Symposium on Cryptography and Information Security Hamamatsu Japan, The Institute of Electronics, Information and Communication Engineers, vol. 2 of 2, pp. 1219-1224.

C.H. Bennett et al., In Proceedings of IEEE Conference on Computers, System and Signal Processing, Bangalore, India, pp. 175-179 (Dec. 1984).

G. Brassard et al., Eurocrypt' 93, Lecture Notes in Computer Science 765, pp. 410-423.

* cited by examiner

*Primary Examiner*—Mujtaba K Chaudry
(74) *Attorney, Agent, or Firm*—Birch Stewart Kolasch & Birch, LLP (57) ABSTRACT

A method of distributing a quantum key through a quantum communication path includes: a transmitting device and a receiving device generating a parity check matrix separately; the transmitting device notifying the receiving device of error correction information generated based on the parity check matrix and transmission data, through a public communication path; the receiving device correcting an error in reception data based on the error correction information. The above processing is repeatedly executed until the error is successfully corrected.

6 Claims, 7 Drawing Sheets

| rate | | 0.5 | |
|---|---|---|---|
| N | | 12.6 | |
| i | $\gamma_i$ | $\lambda(\gamma_i)$ | $n(\gamma_i)$ |
| 1 | 2 | 0.27381 | 69 |
| 2 | 3 | 0.10714 | 18 |
| 3 | 8 | 0.61905 | 39 |
| u | | $\rho_u$ | $n_u$ |
| 8 | | 1 | 63 |

FIG.6

$$H \times m_A = S_A$$

$$H' \times m_A = \begin{matrix} S_A \\ S_A' \end{matrix}$$

(H' is (k+t)×n, $m_A$ is n×1, result is k+t with $S_A$ of size k and $S_A'$ of size t)

"RELATED ART"

QUANTUM KEY DELIVERY METHOD AND COMMUNICATION DEVICE

TECHNICAL FIELD

The present invention relates to a quantum key distribution method capable of generating a common key, security of which is highly guaranteed, and more particularly, to a quantum key distribution method capable of correcting a data error using an error correction code and a communication apparatus capable of realizing the quantum key distribution.

BACKGROUND ART

The conventional quantum cryptograph system is explained below. In recent years, optical communication is widely used as a high-speed large-capacity communication technology. In such an optical communication system, communication is performed according to ON/OFF of light and a large quantity of photons are transmitted when light is ON. Thus, the optical communication system is not a communication system in which a quantum effect is developed directly.

On the other hand, in the quantum cryptograph system, photons are used as communication media to transmit information of one bit using one photon such that a quantum effect such as uncertainty principle is developed. In this case, when a wiretapper selects a base at random and measures photons without knowing a quantum state such as polarization and a phase of the photons, the quantum state changes. Therefore, on the reception side, it is possible to recognize, by confirming the change in the quantum state of the photons, whether transmitted data has been wiretapped.

Figure 10:
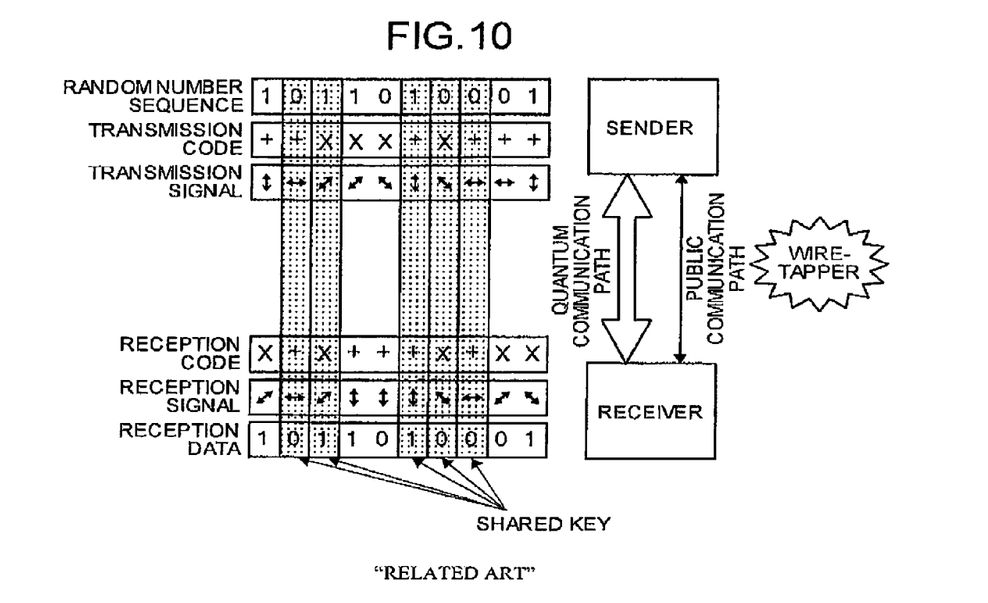
FIG. 10 is a schematic of the conventional quantum key distribution.

FIG. 10 is a schematic of the conventional quantum key distribution using polarized light. For example, a measuring device, which is capable of identifying polarized light in horizontal and vertical directions, identifies light polarized in the horizontal direction (0°) and light polarized in the vertical direction (90°) on a quantum communication path correctly. On the other hand, a measuring device, which is capable of identifying polarized light in oblique directions (45° and 135°), identifies light polarized in the 45° direction and 135° direction on a quantum communication path correctly.

In this way, the respective measuring devices can recognize light polarized in the defined directions correctly. However, for example, when the measuring device, which is capable of identifying polarized light in the horizontal and vertical directions (0° and 90°), measures light polarized in an oblique direction, the measuring device identifies light polarized in the horizontal direction and light polarized in the vertical direction at random at a probability of 50 percent, respectively. In other words, when the measuring device that does not cope with identifiable polarization directions is used, it is impossible to identify a direction in which light is polarized even if a result of measurement by the measuring device is analyzed.

In the conventional quantum key distribution shown in FIG. 10, a sender and a receiver share a key while keeping the key secret from wiretappers (see, for example, Bennett, C. H. and Brassard, G.: Quantum Cryptography: Public Key Distribution and Coin Tossing, In Proceedings of IEEE Conference on Computers, System and Signal Processing, Bangalore, India, pp. 175-179 (December 1984)). Note that the sender and the receiver can use a public communication path other than the quantum communication path.

A procedure for sharing a key is explained. First, the sender generates a random number sequence (a sequence of 1 and 0: transmission data) and determines transmission codes (+: a code corresponding to the measuring device capable of identifying light polarized in the horizontal and vertical directions, x : a code corresponding to the measuring device capable of identifying light polarized in the oblique directions) at random. A polarization direction of light to be transmitted is automatically determined according to combinations of the random number sequence and the transmission codes. Light polarized in the horizontal direction according to a combination of 0 and +, light polarized in the vertical direction according to a combination of 1 and +, light polarized in the 45° direction according to a combination of 0 and x, and light polarized in the 135° direction according to a combination of 1 and x are transmitted to the quantum communication path, respectively (transmission signals).

The receiver determines reception codes (+: a code corresponding to the measuring device capable of identifying light polarized in the horizontal and vertical directions, x: a code corresponding to the measuring device capable of identifying light polarized in the oblique directions) at random and measures light on the quantum communication path (reception signals). The receiver obtains reception data according to combinations of the reception codes and the reception signals. The receiver obtains 0, 1, 0, and 1 as reception data according to a combination of the light polarized in the horizontal direction and +, a combination of the light polarized in the vertical direction and +, a combination of the light polarized in the 45° direction and x, and a combination of the light polarized in the 135° direction and x, respectively.

In order to check whether measurement for the receiver has been performed by a correct measuring device, the receiver sends the reception codes to the sender thorough the public communication path. The sender, who has received the reception codes, checks whether the measurement has been performed by a correct measuring device and returns a result of the check to the receiver through the public communication path.

The receiver keeps only the reception data corresponding to the reception signals received by the correct measuring device and disposes of other reception data. At this point, the reception data kept can be shared by the sender and the receiver surely.

The sender and the receiver send a predetermined number of data selected from the shared data to each other through the public communication path. Then, the sender and the receiver check whether the reception data coincide with the data held by the sender and the receiver themselves. For example, if at least one data among the data checked does not coincide with the data held by the sender and the receiver, the sender and the receiver judge that a wiretapper is present, dispose of the shared data, and repeat the procedure for sharing a key from the beginning. On the other hand, when all the data checked coincide with the data held by the sender and the receiver, the sender and the receiver judge that no wiretapper is present, dispose of the data used for the check, and use the remaining shared data as a shared key for the sender and the receiver.

On the other hand, as an application of the conventional quantum key distribution method, for example, there is a quantum key distribution method that is capable of correcting a data error on a transmission path (see, for example, Brassard, G. and Salvail, L. 1993 Secret-Key Reconciliation by Public Discussion, In Advances in Cryptology—EUROCRYPT' 93, Lecture Notes in Computer Science 765, 410 to 423).

In this method, to detect a data error, a sender divides transmission data into plural blocks and sends a parity for each block on a public communication path. Then, a receiver compares the parity for each block received through the public communication path and a parity of a corresponding block in reception data to check a data error. In this case, when there is a different parity, the receiver returns information indicating a block of the different parity on the public communication path. The sender further divides the pertinent block into a former half block and a latter half block and returns, for example, a former half parity on the public communication path (binary search). Thereafter, the sender and the receiver specify a position of an error bit by repeatedly executing the binary search. Finally, the receiver corrects the bit.

Moreover, assuming that a parity is judged as correct because of an even number of errors regardless of an error in data, the sender rearranges transmission data at random (random replacement) to divide the transmission data into plural blocks and performs the error correction processing with the binary search again. Then, the sender repeatedly executes this error correction processing with the random replacement to thereby correct all the data errors.

However, an error communication path is not assumed in the conventional quantum key distribution shown in FIG. 10. Therefore, when there is an error, the sender and the receiver dispose of the common data (the common key) judging that a wiretapping act is performed. This extremely deteriorates efficiency of generation of a common key depending on a transmission path.

In the quantum key distribution method capable of correcting a data error on the transmission path, parities are exchanged an extremely large number of times to specify an error bit and the error correction processing by the random replacement is performed for a predetermined number of times. Therefore, a great deal of time is consumed for the error correction processing.

The present invention has been devised in view of the circumstances and it is an object of the present invention to provide a quantum key distribution method that is capable of generating a common key, security of which is highly guaranteed, while correcting a data error on a transmission path using an error correcting code having an extremely high property.

DISCLOSURE OF INVENTION

A method according to the present invention is a method of distributing a quantum key by adopting, as shared information, a result of estimating transmission data by correcting an error in reception data with probability information, which is obtained by measuring photons on a quantum communication path. The method includes: a first-check-matrix-generating step at which communication apparatuses on a transmission side and a reception side generate first parity-check matrixes (identical matrixes with an element "0" or "1") separately; a first-error-correction-information-notifying step at which the communication apparatus on the transmission side notifies the communication apparatus on the reception side of first error correction information, which is generated based on the first parity-check matrix and the transmission data, through a public communication path; a first error-correcting step at which the communication apparatus on the reception side corrects an error in the reception data based on the first error-correction information; a second-check-matrix-generating step at which, when the error in the reception data is not successfully corrected completely, the communication apparatuses on the reception side and the transmission side generate second parity-check matrixes (identical matrixes with an element "0" or "1") separately such that error correction information of a last time becomes a part of information at next error correction time; a second-error-correction-information-notifying step at which the communication apparatus on the transmission side notifies the communication apparatus on the reception side of additional second error-correction information, which is generated based on the second parity-check matrix and the transmission data, through the public communication path; a second error-correcting step at which the communication apparatus on the reception side corrects the error in the reception data based on the first error-correction information and the second error-correction information; and an encryption-key generating step at which, when the error in the reception data is successfully corrected in processing at the first error-correcting step completely or when the error is successfully corrected completely by repeatedly executing processings at the second-check-matrix-generating step, the second-error-correction-information-notifying step, and the second error correcting step, the communication apparatuses on the transmission side and the reception side dispose of a part of the shared information according to an mount of error-correction information made public and set a result of the disposal as an encryption key.

According to the present invention, the communication apparatus corrects an error of reception data using a definite parity check matrix to dispose of a part of shared information according to error correction information made public. Thus, there is an effect that it is possible to reduce time required for error correction processing significantly. Further, the communication apparatus repeatedly executes error correction processing while increasing the number of rows of a parity check matrix under a predetermined binding condition until an error of reception data is successfully corrected completely. Since this makes it unnecessary to dispose of generated shared information to estimate a noise level on a communication path, there is an effect that it is possible to improve efficiency of generation of a shared key significantly.

BEST MODE(S) FOR CARRYING OUT THE INVENTION

Exemplary embodiments of a quantum key distribution method and a communication apparatus according to the present invention are explained in detail below with reference to the accompanying drawings. Note that the present invention is not limited by the embodiments. Quantum key distribution using polarized light is explained below as an example. However, the present invention is also applicable to, for example, quantum key distribution using a phase, quantum key distribution using a frequency, and the like. There is no specific limitation on what kind of quantum state is used.

Quantum key distribution is a key distribution system, security of which is guaranteed regardless of a computing ability of a wiretapper. For example, to generate a shared key efficiently, it is necessary to remove an error of data that is caused when the data is transmitted through a transmission path. Thus, in this embodiment, quantum key distribution for performing error correction using a Low-Density Parity-Check (LDPC) code, which is known as having an extremely high property, is explained.

Figure 1:
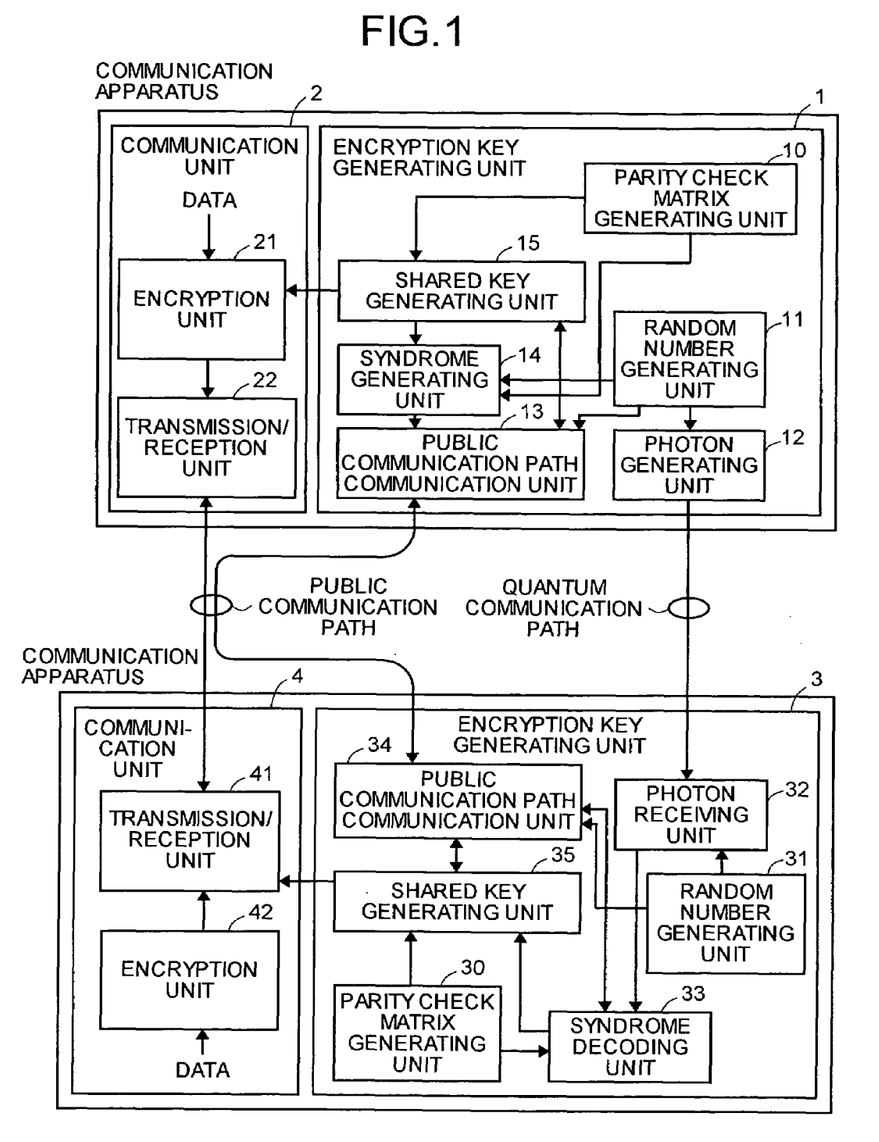
FIG. 1 is a block diagram of a structure of a quantum cryptograph system according to the present invention.

FIG. 1 is a block diagram of a structure of a quantum cryptograph system (communication apparatuses on a transmission side and a reception side) according to the present invention. This quantum cryptograph system includes the communication apparatus on the transmission side, which has a function of transmitting information $m_a$, and the communication apparatus on the reception side, which has a function of receiving the information $m_a$ affected by noise and the like on a transmission path, that is, information $m_b$.

The communication apparatus on the transmission side includes an encryption key generating unit 1, which transmits the information $m_a$ through a quantum communication path, transmits a syndrome $S_A$ thorough a public communication path, and generates an encryption key (a common key common to the transmission side and the reception side) based on the transmitted information, and a communication unit 2 in which a transmission/reception unit 22 transmits and receives data, which is encrypted by an encryption unit 22 based on the encryption key, through the public communication path. The communication apparatus on the reception side includes an encryption key generating unit 3, which receives the information $m_b$ through the quantum communication path, receives the syndrome $S_A$ through the public communication path, and generates an encryption key (a common key common to the reception side and the transmission side) based on information on the received information, and a communication unit 4 in which a transmission/reception unit 41 transmits and receives data, which is encrypted by an encryption unit 42 based on the encryption key, through the public communication path.

The communication apparatus on the transmission side transmits light polarized in a predetermined direction using a polarization filter (see FIG. 10) to the communication apparatus on the reception side as the information $m_a$ to be transmitted on the quantum communication path. On the other hand, the communication apparatus on the reception side identifies light polarized in the horizontal direction (0°), light polarized in the vertical direction (90°), light polarized in the 45° direction, and light polarized in the 135° direction on the quantum communication path using a measuring device capable of identifying polarized light in the horizontal and vertical directions (0° and 90°) and a measuring device capable of identifying polarized light in the oblique directions (45° and 135°). Not that the respective measuring devices can recognize light polarized in the defined directions correctly. However, for example, when the measuring device, which is capable of identifying polarized light in the horizontal and vertical directions (0° and 90°), measures light polarized in an oblique direction, the measuring device identifies light polarized in the horizontal direction and light polarized in the vertical direction at random at a probability of 50 percent, respectively. In other words, when the measuring device that does not cope with identifiable polarization directions is used, it is impossible to identify a direction in which light is polarized even if a result of measurement by the measuring device is analyzed.

Figure 2:
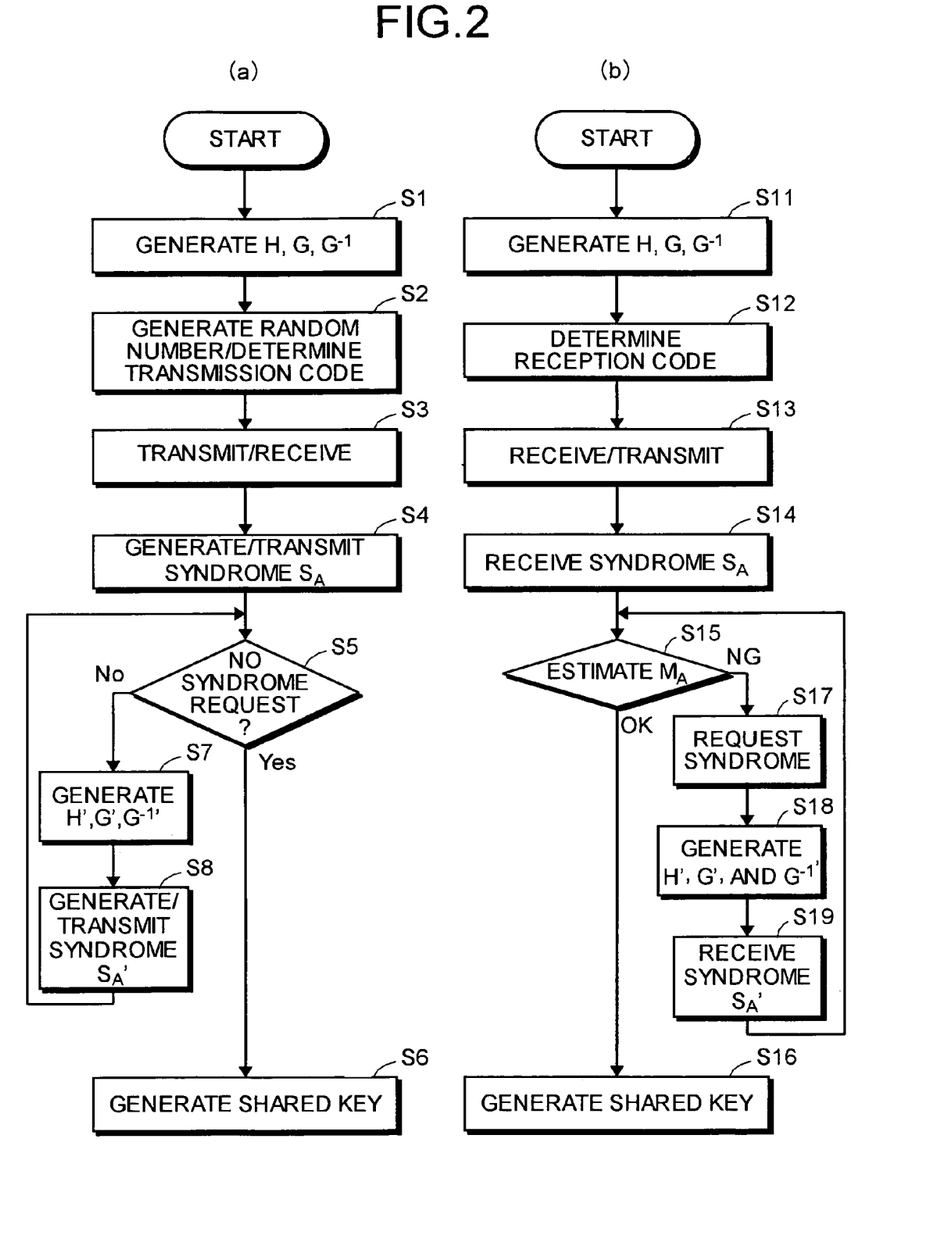
FIG. 2 is a flowchart of processing for quantum key distribution according to the present invention.

Operations of the respective communication apparatuses in the quantum cryptograph system, that is, quantum key distribution in this embodiment is explained in detail below. FIG. 2 is a flowchart of an outline of the quantum key distribution in this embodiment. Specifically, FIG. 2($a$) is a flowchart of processing in the communication apparatus on the transmission side and FIG. 2($b$) is a flowchart of processing in the communication apparatus on the reception side.

First, in the communication apparatus on the transmission side and the communication apparatus on the reception side, parity check matrix generating units 10 and 30 calculate a parity check matrix H (a matrix of n×k) of a specific linear code, calculate a generator matrix G (a matrix of (n−k)×n) satisfying a condition "HG=0" from this parity check matrix H, and calculate an inverse matrix $G^{-1}$ (a matrix of n×(n−k)) of G satisfying a condition $G^{-1} \cdot G = I$ (unit matrix) (step S1 and step S11). In an explanation of the quantum key distribution in this embodiment, an LDPC code having an excellent property extremely close to the Shannon limit is used as the specific linear code. Note that, although the LDPC code is used as an error correction system, the present invention is not limited to this and, for example, other linear codes like a turbo code may be used. In addition, for example, if error correction information (a syndrome) described later is an error correction protocol represented by a product $Hm_A$ of an appropriate matrix H and a transmission data $m_A$ (a part of the information $m_a$) (e.g., an error correction protocol equivalent to the "quantum key distribution capable of correcting a data error on a transmission path" explained in the conventional technology), that is, if linearity of the error correction information and the transmission data $m_A$ is secured, the matrix H may be used.

Figure 3:
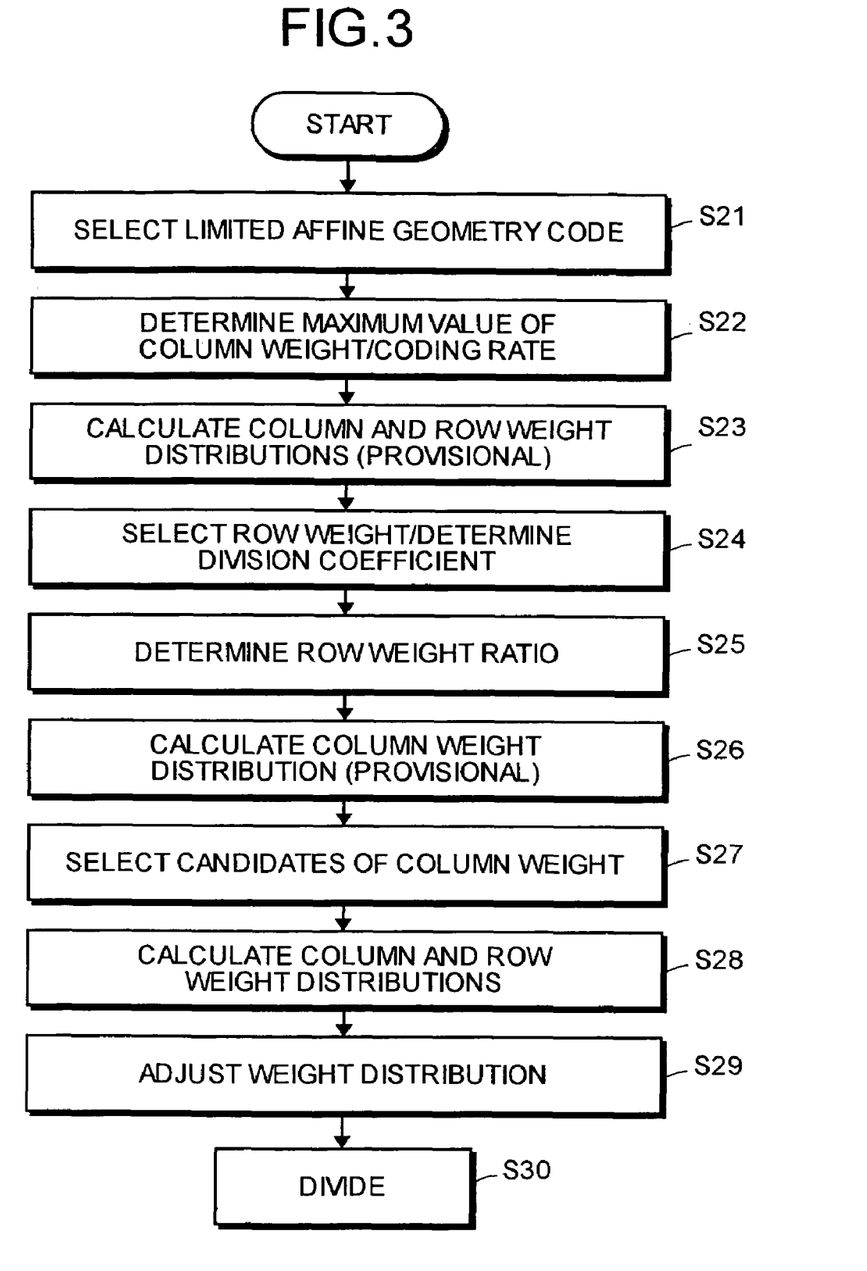
FIG. 3 is a flowchart of a method of forming an "Irregular-LDPC code" based on the limited affine geometry.

A method of forming a check matrix for an LDPC code in the parity check matrix generating unit 10 is explained. In this embodiment, as an example of the method, a method of forming a check matrix for an "Irregular-LDPC code" based on the limited affine geometry (a detail of step S1 in FIG. 2) is explained. FIG. 3 is a flowchart of the method of forming a check matrix for an "Irregular-LDPC code" based on the limited affine geometry. Note that, since the parity check matrix generating unit 30 operates in the same manner as the parity check matrix generating unit 10, an explanation of the parity check matrix generating unit 30 is omitted. Parity check matrix generation processing in this embodiment may be, for example, executed by the parity check matrix generating unit 10 or may be executed by another control apparatus (a computer, etc.) outside a communication apparatus depending on parameters to be set. When the parity check matrix generation processing in this embodiment is executed outside the communication apparatus, a generated parity check matrix is stored in the communication apparatus. In explanations of the following embodiments, the processing is executed by the parity check matrix generating unit 10.

Figure 4:
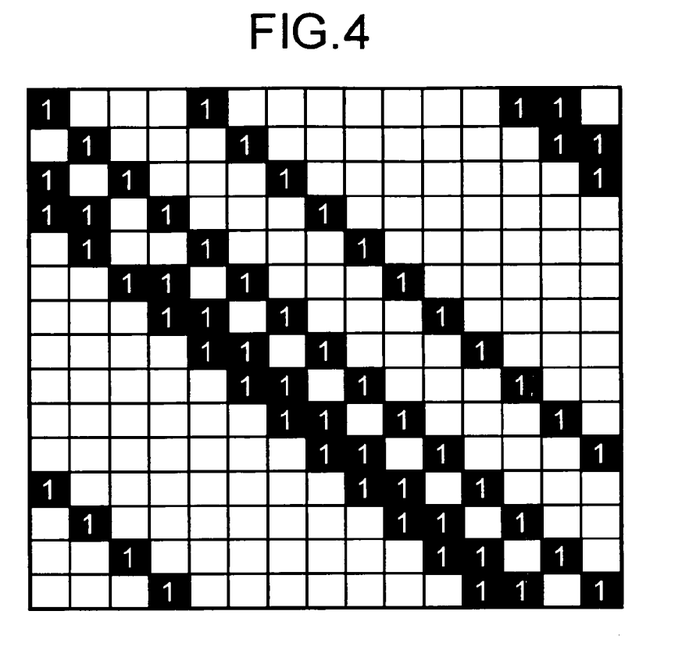
FIG. 4 is a diagram of a matrix of a limited affine geometry code AG $(2, 2^2)$.

First, the parity check matrix generating unit 10 selects a limited affine geometry code AG (2, $2^s$) forming a base of a check matrix for an "Irregular-LDPC code" (step S21 in FIG. 3). A row weight and a column weight are $2^s$, respectively. FIG. 4 is a diagram of, for example, a matrix of a limited affine geometry code AG (2, $2^2$) (blanks represent 0).

The parity check matrix generating unit 10 determines a maximum value $r_1$ ($2 < r_1 \leq 2^s$) of the column weight (step S22). Then, the parity check matrix generating unit 10 determines a coding rate (one syndrome length/a length of a key) (step S22).

The parity check matrix generating unit 10 provisionally calculates a column weight distribution $\lambda(\gamma_i)$ and a row weight distribution $\rho_u$ using optimization by the Gaussian Approximation (step S23). Note that a generating function $\rho(x)$ for a row weight distribution is set as $\rho(x)=\rho_u x^{u-1}+(1-\rho_u)x^u$. A weight u is an integer equal to or larger than 2 and $\rho_u$ represents a ratio of the weight u in a row.

The parity check matrix generating unit 10 selects a row weight $\{u, u+1\}$ that can be formed by division of a row of the limited affine geometry and calculates a division coefficient $\{b_u, b_{u+1}\}$ satisfying expression (1) below (step S24). Note that $b_u$ and $b_{u+1}$ are assumed to be non-negative integers.

$$b_u + b_{u+1} 1(u+1) = 2^s \quad (1)$$

Specifically, the parity check matrix generating unit 10 calculates $b_u$ from expression (2) below and calculates $b_{u+1}$ form expression (1) above.

$$\arg\cdot\min_{bu}\left|\varphi_u - \frac{u \times b_u}{2^s}\right| \quad (2)$$

The parity check matrix generating unit 10 calculates ratios $\rho_u'$ and $\rho_{u+1}'$ of the row weight updated by the parameters determined u, u+1, $b_u$, and $b_{u+1}$ according to expression (3) (step S25).

$$\varphi_u' = \frac{u \times b_u}{2^s}$$

$$\varphi_{u+1}' = \frac{(u+1) \times b_{u+1}}{2^s} \quad (3)$$

The parity check matrix generating unit 10 provisionally calculates a column weight distribution $\lambda(\gamma_i)$ using optimization by the Gaussian Approximation and with u, u+1, $\rho_u'$, and $\rho_{u+1}'$ calculated above as fixed parameters (step S26). Note that the weight $\gamma_i$ is an integer equal to or larger than 2 and $\lambda(\gamma_i)$ represents a ratio of the weight $\gamma_i$ in the column. The parity check matrix generating unit 10 excludes a weight with the number of columns equal to or smaller than $1(\lambda(\gamma_i) \leq \gamma_i/w_t$, i is a positive integer) from column weight candidates. $w_t$ represents a total number of 1 included in AG(2, $2^s$).

The parity check matrix generating unit 10 selects a set of column weight candidates $\{\gamma_1, \gamma_2, \ldots, \gamma_1(\gamma_1 \leq 2^s)\}$ that satisfy the weight distribution calculated above and satisfy expression (4) below (step S27). When a column weight $\gamma_i$ not satisfying expression (4) is present, the column weight is excluded from the candidates.

$$\begin{bmatrix} a_{1,1} & a_{1,2} & \cdots & a_{1,l} \\ a_{2,1} & a_{2,2} & \cdots & a_{2,l} \\ \vdots & & \cdots & \vdots \end{bmatrix} \begin{bmatrix} \gamma_1 \\ \gamma_2 \\ \vdots \\ \gamma_l \end{bmatrix} = \begin{bmatrix} 2^s \\ 2^s \\ \vdots \\ 2^s \end{bmatrix} \quad (4)$$

Note that the respective a's represent non-negative integer coefficients with respect to $\{\gamma_1, \gamma_2, \ldots, \gamma_1\}$ for forming the column weight $2^s$, i and j are positive integers, $\gamma_i$ represents a column weight, and $\gamma_1$ represents a maximum column weight.

The parity check matrix generating unit 10 calculates a column weight distribution $\lambda(\gamma_i)$ and a row weight distribution $\rho_u$ using optimization by the Gaussian Approximation and with u+1, $\rho_u'$, $\mu_{u+1}'$, and $\{\gamma_1, \gamma_2, \ldots, \gamma_1\}$ calculated above as fixed parameters (step S28).

Figure 5:
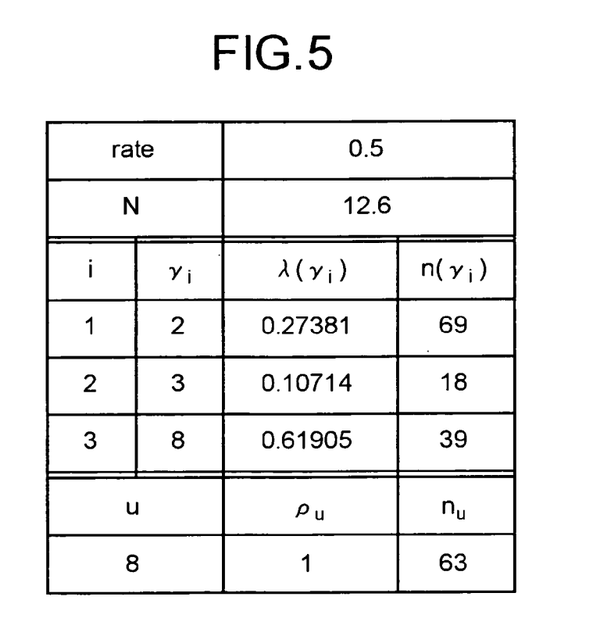
FIG. 5 is a table of final column weight distribution and row weight distribution.

Before performing division processing, the parity check matrix generating unit 10 adjusts the column weight distribution $\lambda(\gamma_i)$ and the row weight distribution $\rho_u$ (step S29). Note that the respective weight distributions after the adjustment are set to values as close as possible to values calculated by the Gaussian Approximation. FIG. 5 is a table of final column weight distribution $\lambda(\gamma_i)$ and row weight distribution $\rho_u$ at step S29. $n(\gamma_i)$ represents a total number of columns by a unit of weight and $n_u$ represents a total number of rows by a unit of weight.

Finally, the parity check matrix generating unit 10 divides rows and columns in the limited affine geometry (step S30) to generate a parity check matrix H of n×k. In the division processing for a limited affine geometry code in the present invention, "1" is extracted from the respective rows and the respective columns at random and divided irregularly (random division). Note that any method may be used for this extraction processing as long as a random nature is maintained.

In this way, in this embodiment, the parity check matrix generating unit 10 generates the check matrix H (n×k) for an "Irregular-LDPC code", which is definite and having a stable characteristic, by executing, for example, the method of forming a check matrix for an "Irregular-LDPC code" based on the limited affine geometry (step S1 in FIG. 2). Note that, in this embodiment, the limited affine geometry is used as a code forming a basis (a basic matrix) (step S21). However, the present invention is not limited to this and a matrix other than the limited affine geometry (a basic matrix according to a Cayley graph, a basic matrix according to a Ramanujan graph, etc.) may be used as long as the matrix satisfies conditions "row and column weights are fixed" and "the number of cycles on a bipartite graph is six or more". In addition, in this embodiment, the parity check matrix generating unit 10 generates, as an example, the check matrix for an "Irregular-LDPC code" based on the limited affine geometry using steps S21 to S29. However, the present invention is not limited to this and the check matrix H generated at steps S1 and S11 may be generated by other method of forming a check matrix.

After generating the parity check matrix H and, then, generating the generator matrixes G and $G^{-1}$ ($G^{-1} \cdot G = I$: unit matrix) as described above, in the communication apparatus on the transmission side, a random number generating unit 11 generates information $m_a$ that is a random number sequence (a sequence of 1 and 0: transmission data). The random number generating unit 11 determines transmission codes (+: a code corresponding to the measuring device capable of identifying light polarized in the horizontal and vertical directions, x: a code corresponding to the measuring device capable of identifying light polarized in the oblique directions) at random (step S2). On the other hand, in the communication apparatus on the reception side, a random number generating unit 31 determines reception codes (+: a code corresponding to the measuring device capable of identifying light polarized in the horizontal and vertical directions, x: a code corresponding to the measuring device capable of identifying light polarized in the oblique directions) at random (step S12).

In the communication apparatus on the transmission side, a photon generating unit 12 transmits photons in a polarization direction that is determined automatically according to combinations of the information $m_a$ and the transmission codes (step S3). For example, light polarized in the horizontal direction according to a combination of 0 and +, light polarized in the vertical direction according to a combination of 1 and +, light polarized in the 45° direction according to a combination of 0 and x, and light polarized in the 135° direction according to a combination of 1 and x are transmitted to the quantum communication path, respectively (transmission signals).

A photon receiving unit 32 of the communication apparatus on the reception side, which has received an optical signal of the photon generating unit 12, measures light on the quantum communication path. The photon receiving unit 32 obtains information $m_b$ (a sequence of 1 and 0: reception data) automatically determined according to combinations of the reception codes and the reception signals (step S13). As the information $m_b$, the photon receiving unit 32 obtains 0, 1, 0, and 0 according to a combination of the light polarized in the horizontal direction and +, a combination of the light polarized in the vertical direction and +, a combination of the light polarized in the 45° direction and x, and a combination of the light polarized in the 135° direction and x, respectively. Note that the reception data $m_b$ is assumed to be a hard decision value with probability information.

In the communication apparatus on the reception side, in order to check whether the measurement has been performed by a correct measuring device, the random number generating unit 31 transmits the reception codes to the communication apparatus on the transmission side thorough a public communication path communication unit 34 and the public communication path (step S13). In the communication apparatus on the transmission side that has received the reception codes, the random number generating unit 11 checks whether the measurement has been performed by a correct measuring device and transmits a result of the check to the communication apparatus on the reception side through a public communication path communication unit 13 and the public communication path (step S3). The communication apparatus on the reception side and the communication apparatus on the transmission side keep only data corresponding to the reception signals received by the correct measuring device and dispose of other data (steps S3 and S13). Thereafter, the communication apparatus on the reception side and the communication apparatus on the transmission side store the remaining data in memories or the like, read out n bits of the data from the top of the data, and set the data as formal transmission data $m_A$ and reception data $m_B$ ($m_B$ is $m_A$ affected by noise or the like on a transmission path: $m_B = m_A + e$ (noise, etc.)). Consequently, the communication apparatus on the transmission side and the communication apparatus on the reception side can share bit positions of the remaining data. Note that, like $m_b$ described above, the reception data $m_B$ is a hard decision value with probability information.

Figure 6:
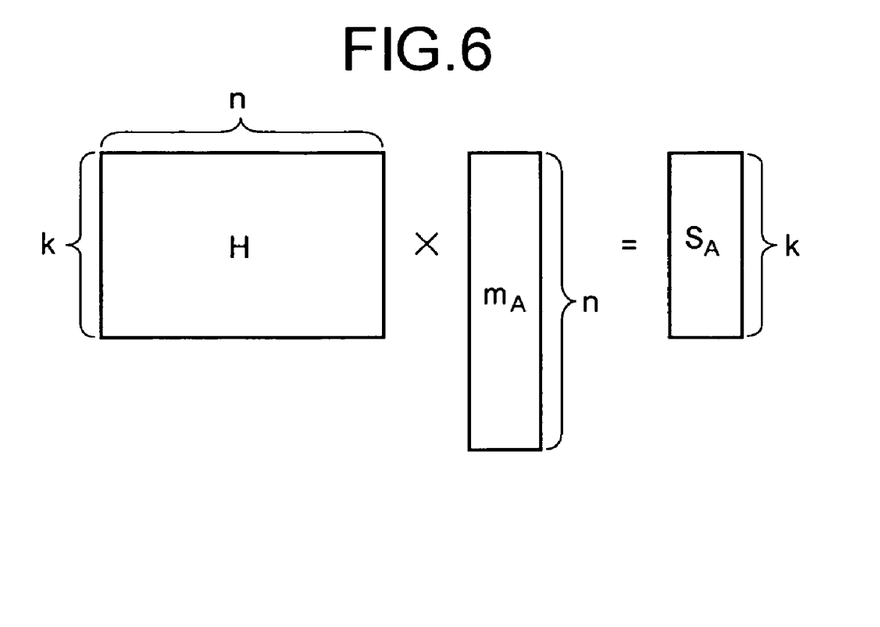
FIG. 6 is a diagram of a syndrome that a communication apparatus on a transmission side transmits to a communication apparatus on a reception side.

In the communication apparatus on the transmission side, a syndrome generating unit 14 calculates a syndrome $S_A = Hm_A$ of $m_A$ using the parity check matrix H (the matrix of n×k) and the transmission data $m_A$ and notifies the communication apparatus on the reception side of a result of the calculation through the public communication path communication unit 13 and the public communication path (step S4). At this stage, it is likely that the syndrome $S_A$ of $m_A$ (information equivalent to k bits) is acquired by a wiretapper. FIG. 6 is a diagram of the syndrome $S_A$ that the communication apparatus on the transmission side transmits to the communication apparatus on the reception side. On the other hand, in the communication apparatus on the reception side, the public communication path communication unit 34 receives the syndrome $S_A$ of $m_A$ and notifies a syndrome decoding unit 33 of the syndrome $S_A$ of $m_A$ (step S14).

The syndrome decoding unit 33 corrects an error of the hard decision value $m_B$ with probability information due to noise or the like using the known syndrome decoding method to thereby estimate the original transmission data $m_A$ (step S15). In this embodiment, for example, the syndrome decoding unit 33 estimates $m_c$ satisfying a condition "$S_A = Hm_c$" from the hard decision value $m_B$ with probability information and sets a result of the estimation $m_c$ as shared information $m_A$. Note that, in this embodiment, the reception data $m_B$ and $m_b$ are hard decision values with probability information. However, the present invention is not limited to this and is also applicable when the reception data are soft decision values. It is not specifically defined what kind of reception data should be used.

When the error of the hard decision value $m_B$ is successfully corrected in the processing at step S15 completely ("OK" at step S15), in the communication apparatus on the reception side, a shared key generating unit 35 disposes of a part of the shared information $m_A$ according to error correction information made public (the information equivalent to k bits that is likely to have been wiretapped: $S_A$) and generates an encryption key r having an amount of information equivalent to n−k bits (step S16). In other words, the shared key generating unit 35 generates the encryption key r according to expression (5) below using $G^{-1}$ (a matrix of n×(n−k)) calculated in advance. The communication apparatus on the reception side sets this encryption key r as a shared key that is shared with the communication apparatus on the transmission side.

$$r = G^{-1} m_A \quad (5)$$

When the error of the hard decision value $m_B$ is corrected in the processing at step S15 completely and there is no new syndrome request ("Yes" at step S15), in the communication apparatus on the transmission side, a shared key generating unit 15 disposes of a part of the shared information $m_A$ according to error correction information made public (the information equivalent to k bits that is likely to have been wiretapped: $S_A$) and generates an encryption key r having an amount of information equivalent to n−k bits (step S6). In other words, the shared key generating unit 15 also generates the encryption key r according to expression (5) above using $G^{-1}$ (the matrix of n×(n−k)) calculated in advance (step S6). The communication apparatus on the transmission side sets this encryption key r as a shared key that is shared with the communication apparatus on the transmission side.

Note that, in this embodiment, the shared key may be further rearranged using a regular random matrix R. This makes it possible to intensify confidentiality. Specifically, first, the communication apparatus on the transmission side generates the regular random matrix R (a matrix of (n−k)×(n−k)) and notifies the communication apparatus on the reception side of the regular random matrix R through the public communication path. Note that the communication apparatus on the reception side may perform this processing. Thereafter, the communication apparatuses on the transmission side and the reception side generates the encryption key r according to expression (6) below using $G^{-1}$ (the matrix of n×(n−k)) calculated in advance and the random matrix R.

$$r = RG^{-1} m_A \quad (6)$$

Figure 7:
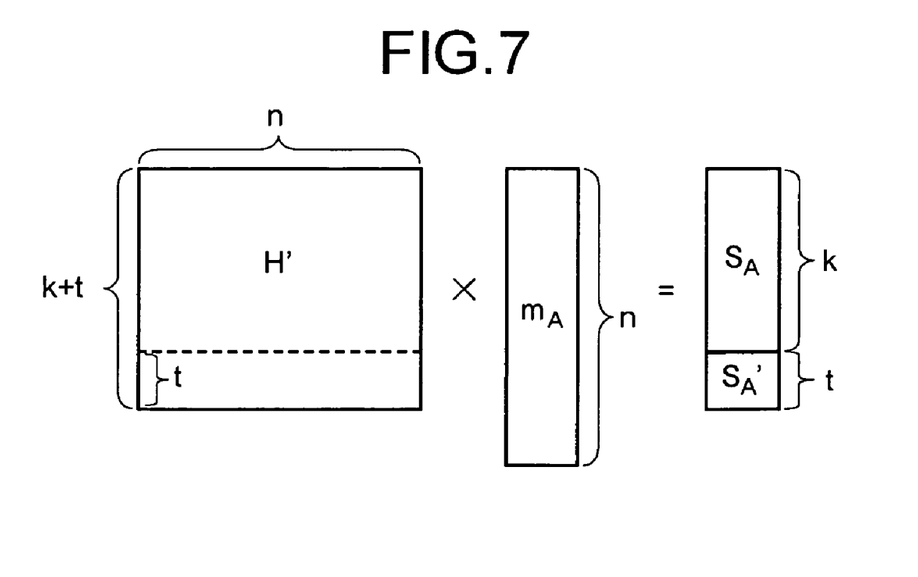
FIG. 7 is a diagram of a parity check matrix generating method in an embodiment of the present invention.

On the other hand, when the error of the hard decision value $m_B$ is not successfully corrected in the processing at step S15 completely ("NG" at step S15), in the communication apparatus on the reception side, the syndrome decoding unit 33 notifies the communication apparatus on the transmission side of a syndrome request through the public communication path communication unit 34 and the public communication path (step S17). The parity check matrix generating unit 30 generates a parity check matrix H' (a matrix of n×(k+t)) according to the method shown in FIG. 3 or a known method different from the method. Thereafter, the parity check matrix generating unit 30 generates generator matrixes G' and $G^{-1'}$ ($G^{-1'} \cdot G' = I$: unit matrix) satisfying a condition "H'G'=0" from this parity check matrix H' (step S18). In this case, the parity check matrix generating unit 30 generates the parity check matrix H' under a binding condition "the syndrome $S_A$ generated at step S4 is held". FIG. 7 is a diagram of a parity check generating method in this embodiment. Note that a size of t depends on a condition required by the system. For example, when the size of t is reduced, while it is likely that the number of times of error correction processing is increased, a key generation rate is improved. When the size of t is increased, while the number of times of error correction processing can be reduced, the key generation rate falls.

In the communication apparatus on the transmission side that has received the syndrome request ("No" at step S5), the parity check matrix generating unit 10 also generates a parity check matrix H' (the matrix of n×(k+t)) according to the method shown in FIG. 3 or a known method different from the method. Thereafter, the parity check matrix generating unit 10 generates generator matrixes G' and $G^{-1'}$ ($G^{-1'} \cdot G' = I$: unit matrix) satisfying a condition "H'G'=0" from this parity check matrix H' (step S7). In this case, the parity check matrix generating unit 10 also generates the parity check matrix H' under a binding condition "the syndrome $S_A$ generated at step S4 is held".

In the communication apparatus on the transmission side, the syndrome generating unit 14 calculates a syndrome $S_A{'}$ equivalent to t rows shown in FIG. 7 using the parity check matrix H' (the matrix of n×(k+t)) and the transmission data $m_A$. The syndrome generating unit 14 notifies the communication apparatus on the reception side of a result of the calculation through the public communication path communication unit 13 and the public communication path (step S8). Note that, at this stage, it is likely that the syndrome $S_A{'}$ (information equivalent to t bits) is acquired by a wiretapper. In the communication apparatus on the reception side, the public communication path communication unit 34 receives the syndrome $S_A{'}$ equivalent to t rows and notifies the syndrome decoding unit 33 of the syndrome $S_A{'}$ (step S19).

The syndrome decoding unit 33 corrects an error of the hard decision value $m_B$ with probability information using the known syndrome decoding method and estimates the original transmission data $m_A$ again (step S15).

Thereafter, the communication apparatus on the reception side in this embodiment repeatedly executes the processing at steps S17 to S19 while increasing the number of rows of the parity check matrix until the error of the hard decision value $m_B$ is successfully corrected in the processing at step S15 completely. At a stage when the error is successfully corrected completely, the shared key generating unit 35 disposes of a part of the shared information $m_A$ according to error correction information made public (e.g., the information equivalent to k+t bits that is likely to have been wiretapped: $S_A + S_A{'}$ (see FIG. 7)). The shared key generating unit 35 generates an encryption key r having, for example, an amount of information equivalent to n−k−t, n−k−2t, n−k−3t, . . . bits (step S16). The communication apparatus on the reception side sets this encryption key r as a shared key that is shared with the communication apparatus on the transmission side.

The communication apparatus on the transmission side in this embodiment repeatedly executes the processing at steps S7 and S8 while increasing the number of rows of the parity check matrix until a new syndrome request is not notified any more. At a stage when a new syndrome request is not notified any more, the shared key generating unit 15 disposes of a part of the shared information $m_A$ according to error correction information made public (e.g., the information equivalent to k+t bits that is likely to have been wiretapped: $S_A + S_A{'}$ (see FIG. 7)). The shared key generating unit 15 generates an encryption key r having, for example, an amount of information equivalent to n−k−t, n−k−2t, n−k−3t, . . . bits (step S6). The communication apparatus on the transmission side sets this encryption key r as a shared key that is shared with the communication apparatus on the reception side.

In this way, in this embodiment, the communication apparatus corrects an error of reception data using a check matrix for an "Irregular-LDPC code", which is definite and having a stable characteristic, to dispose of a part of shared information according to error correction information made public. Consequently, parities are not exchanged an extremely large number of times to specify and correct error bits and error correction control is performed simply by transmitting the error correction information. Thus, it is possible to reduce time required for error correction processing significantly. In addition, since a part of shared information is disposed of according to information made public, it is possible to generate a common key, security of which is highly guaranteed.

In this embodiment, the communication apparatus repeatedly executes error correction processing while increasing the number of rows of a parity check matrix under a predetermined binding condition until an error of reception data is successfully corrected completely. Since this makes it unnecessary to dispose of generated shared information to estimate a noise level on a communication path, it is possible to improve efficiency of generation of a shared key significantly.

A quantum key distribution method in a second embodiment is explained. Note that, since structures of a communication apparatus on a transmission side and a communication apparatus on a reception side are the same as those in the first embodiment explained above, components of the communication apparatuses are denoted by the identical reference numerals and explanations of the components are omitted.

Figure 8:
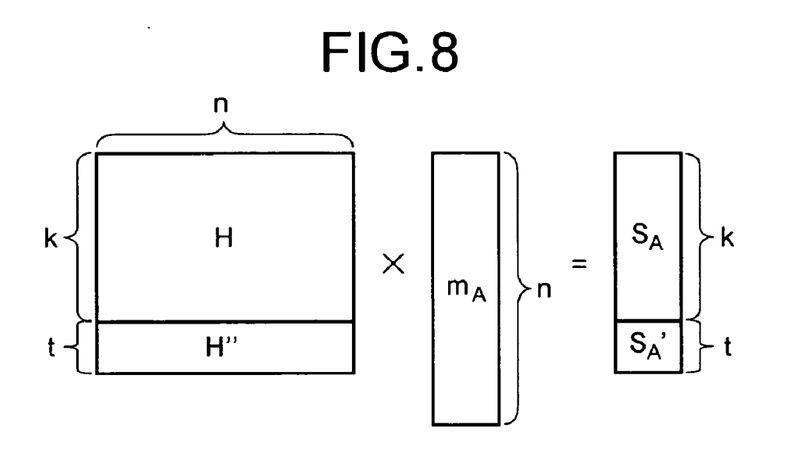
FIG. 8 is a diagram of an operation in a second embodiment at the time when an error of a hard decision value $m_B$ is not successfully corrected in the processing at step S15 completely.

FIG. 8 is a diagram of an operation in the second embodiment that is performed when an error of the hard decision value $m_B$ is not successfully corrected in the processing at step S15 completely. Processing at steps S17 to S19, S7, and S8, which is a characteristic operation in this embodiment, is explained with reference to FIG. 2.

For example, when the error of the hard decision value $m_B$ is not successfully corrected in the processing at step S15 completely ("NG" at step S15), to correct the error completely, the syndrome decoding unit 33 of the communication apparatus on the reception side notifies the communication apparatus on the transmission side of a syndrome request through the public communication path communication unit 34 and the public communication path (step S17).

The parity check matrix generating unit 30 generates, as shown in FIG. 8, a parity check matrix H" equivalent to t rows (a matrix of n×t) additionally in a state in which the parity check matrix H is held. Thereafter, the parity check matrix generating unit 30 generates generator matrixes G' and $G^{-1'}$ ($G^{-1'} \cdot G' = I$: unit matrix) satisfying a condition "H'G'=0" from a parity check matrix H' obtained by combining the original parity check matrix H and the matrix H" (a matrix of n×(k+t)) (step S18). In this case, the parity check matrix generating unit 30 generates a weight distribution of the parity check matrix H" according to the method shown in FIG. 3 or a known method different from the method under binding conditions "the parity check matrix H' is rankH'=k+t (linearly independent)" and "the parity check matrix H' holds the original parity check matrix H". Note that a size of t depends on a condition required by the system. For example, when the size of t is reduced, while it is likely that the number of times of error correction processing is increased, a key generation rate is improved. When the size of t is increased, while the number of times of error correction processing can be reduced, the key generation rate falls.

In the communication apparatus on the transmission side that has received the syndrome request ("No" at step S5), in the same processing as described above, the parity check matrix generating unit 10 also generates a parity check matrix H" equivalent to t rows additionally in the state in which the parity check matrix H is held (see FIG. 8). Thereafter, the parity check matrix generating unit 10 generates generator matrixes G' and $G^{-1}$' ($G^{-1}$'·G'=I: unit matrix) satisfying a condition "H'G'=0" from a check matrix H' obtained by combining the original parity check matrix H and the matrix H" (step S7).

In the communication apparatus on the transmission side, the syndrome generating unit 14 calculates a syndrome $S_A$' equivalent to t rows shown in FIG. 8 using the parity check matrix H' and the transmission data $m_A$. The syndrome generating unit 14 notifies the communication apparatus on the reception side of a result of the calculation through the public communication path communication unit 13 and the public communication path (step S8). Note that, at this stage, it is likely that the syndrome $S_A$' (information equivalent to t bits) is acquired by a wiretapper. In the communication apparatus on the reception side, the public communication path communication unit 34 receives the syndrome $S_A$' equivalent to t rows and notifies the syndrome decoding unit 33 of the syndrome $S_A$' (step S19).

The syndrome decoding unit 33 corrects an error of the hard decision value $m_B$ with probability information using the known syndrome decoding method and estimates the original transmission data $m_A$ again (step S15). In this embodiment, for example, the syndrome decoding unit 33 estimates $m_c$ satisfying a condition "($S_A$+$S_A$')=H'$m_c$" from the hard decision value $m_B$ with probability information and sets a result of the estimation $m_c$ as shared information $m_A$.

Thereafter, the communication apparatus on the reception side in this embodiment repeatedly executes the processing at steps S17 to S19 while increasing the number of rows of the parity check matrix until the error of the hard decision value $m_B$ is successfully corrected in the processing at step S15 completely. At a stage when the error is successfully corrected completely, the shared key generating unit 35 disposes of a part of the shared information $m_A$ according to error correction information made public (e.g., the information equivalent to k+t bits that is likely to have been wiretapped: $S_A$+$S_A$' (see FIG. 8)). The shared key generating unit 35 generates an encryption key r having, for example, an amount of information equivalent to n−k−t, n−k−2t, n−k−3t, . . . bits (step S16). The communication apparatus on the reception side sets this encryption key r as a shared key that is shared with the communication apparatus on the transmission side.

The communication apparatus on the transmission side in this embodiment repeatedly executes the processing at steps S7 and S8 while increasing the number of rows of the parity check matrix until a new syndrome request is not notified any more. At a stage when a new syndrome request is not notified any more, the shared key generating unit 15 disposes of a part of the shared information $m_A$ according to error correction information made public (e.g., the information equivalent to k+t bits that is likely to have been wiretapped: $S_A$+$S_A$' (see FIG. 8)). The shared key generating unit 15 generates an encryption key r having, for example, an amount of information equivalent to n−k−t, n−k−2t, n−k−3t, . . . bits (step S6). The communication apparatus on the transmission side sets this encryption key r as a shared key that is shared with the communication apparatus on the reception side.

In this way, in this embodiment, as in the first embodiment, the communication apparatus repeatedly executes the error correction processing while increasing the number of rows of the parity check matrix under a predetermined binding condition until an error of reception data is successfully corrected completely. Since this makes it unnecessary to dispose of shared information that is generated to estimate a noise level on a communication path, it is possible to improve efficiency of generation of a shared key significantly.

A quantum key distribution method in a third embodiment is explained. In the first and the second embodiments, the communication apparatus disposes of a part of the shared information $m_A$ according to error correction information made public to generate the encryption key r. In other words, a length of the encryption key r is reduced every time the error correction processing is repeated. On the other hand, in this embodiment, a communication apparatus generates an encryption key r with a fixed length according to the processing described below. Note that, since structures of a communication apparatus on a transmission side and a communication apparatus on a reception side are the same as those in the first embodiment explained above, components of the communication apparatuses are denoted by the identical reference numerals and explanations of the components are omitted.

Figure 9:
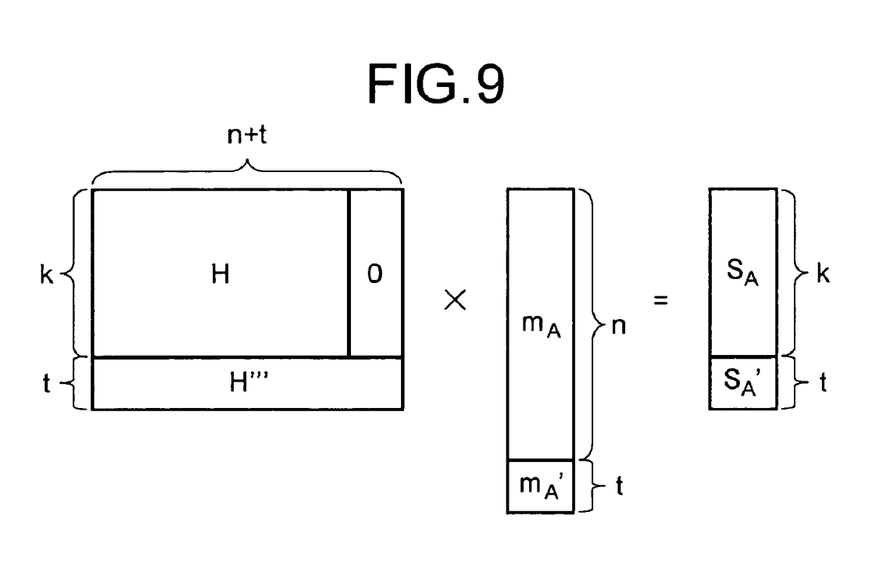
FIG. 9 is a diagram of an operation in a third embodiment at the time when the error of the hard decision value $m_B$ is not successfully corrected in the processing at step S15 completely.

FIG. 9 is a diagram of an operation in the third embodiment that is performed when an error of the hard decision value $m_B$ is not successfully corrected in the processing at step S15 completely. Processing at steps S17 to S19, S7, and S8, which is a characteristic operation in this embodiment, is explained with reference to FIG. 2.

For example, when the error of the hard decision value $m_B$ is not successfully corrected in the processing at step S15 completely ("NG" at step S15), to correct the error completely, the syndrome decoding unit 33 of the communication apparatus on the reception side notifies the communication apparatus on the transmission side of a syndrome request through the public communication path communication unit 34 and the public communication path (step S17).

The parity check matrix generating unit 30 generates, as shown in FIG. 9, a parity check matrix H'" equivalent to t rows (a matrix of (n+t)×t) additionally in a state in which the parity check matrix H is held. Thereafter, the parity check matrix generating unit 30 generates generator matrixes G' and $G^{-1}$' ($G^{-1}$'·G'=I: unit matrix) satisfying a condition "H'G'=0" from a parity check matrix H' (a matrix of (n+t)×(k+t)) obtained by combining the original parity check matrix H, a 0 matrix (a 0 matrix of t×k) equivalent to t columns, and the matrix H'" (step S18). In this case, the parity check matrix generating unit 30 generates a weight distribution of the parity check matrix H'" according to the method shown in FIG. 3 or a known method different from the method under a binding condition "the parity check matrix H' is rankH'=k+t (linearly independent)" and "the parity check matrix H' holds the original parity check matrix H". Note that a size of t depends on a condition required by the system. The 0 matrix equivalent to t columns does not always have to be the 0 matrix if the binding condition is satisfied.

In the communication apparatus on the transmission side that has received the syndrome request ("No" at step S5), in the same processing as described above, the parity check matrix generating unit 10 also generates a parity check matrix H'" equivalent to t rows additionally in the state in which the parity check matrix H is held (see FIG. 9). Thereafter, the parity check matrix generating unit 10 generates generator matrixes G' and $G^{-1}$' ($G^{-1}$'·G'=I: unit matrix) satisfying a condition "H'G'=0" from a matrix H' obtained by combining the original parity check matrix H, a 0 matrix equivalent to t columns, and the matrix H'" (step S7).

In the communication apparatus on the transmission side, the syndrome generating unit 14 reads out transmission data $m_A'$ equivalent to t bits that is stored in the memory or the like in the processing at step S3. The syndrome generating unit 14 calculates a syndrome $S_A'$ equivalent to t rows shown in FIG. 9 using the transmission data $m_A'$, the transmission data $m_A$, and the parity check matrix H'. The syndrome generating unit 14 notifies the communication apparatus on the reception side of a result of the calculation through the public communication path communication unit 13 and the public communication path (step S8). In the communication apparatus on the reception side, the public communication path communication unit 34 receives the syndrome $S_A'$ equivalent to t rows and notifies the syndrome decoding unit 33 of the syndrome $S_A'$ (step S19). Note that, at this stage, it is likely that the syndrome $S_A'$ (information equivalent to t bits) is acquired by a wiretapper.

The syndrome decoding unit 33 reads out reception data $m_B'$ equivalent to t bits that is stored in the memory or the like in the processing at step S13. The syndrome decoding unit 33 corrects errors of the hard decision value $m_B$ with probability information and the reception data $m_B'$ using the known syndrome decoding method and estimates the original transmission data $m_A$ and the transmission data $m_A'$ (step S15). In this embodiment, for example, the syndrome decoding unit 33 estimates $m_c$ satisfying a condition "$(S_A+S_A')=H'm_c$" from the hard decision value $m_B$ with probability information and the reception data $m_B'$ and sets a result of the estimation $m_c$ as shared information $m_A$.

Thereafter, the communication apparatus on the reception side in this embodiment repeatedly executes the processing at steps S17 to S19 while increasing the number of rows and the number of columns of the parity check matrix until the error of the hard decision value $m_B$ is successfully corrected in the processing at step S15 completely. At a stage when the error is successfully corrected completely, the shared key generating unit 35 disposes of a part of the shared information ($m_A + m_A'$) according to error correction information made public (e.g., the information equivalent to k+t bits that is likely to have been wiretapped: $S_A+S_A'$ (see FIG. 9)). The shared key generating unit 35 generates an encryption key r always having a fixed amount of information equivalent to n−k bits (step S16). The communication apparatus on the reception side sets this encryption key r as a shared key that is shared with the communication apparatus on the transmission side.

The communication apparatus on the transmission side in this embodiment repeatedly executes the processing at steps S7 and S8 while increasing the number of rows and the number of columns of the parity check matrix until a new syndrome request is not notified any more. At a stage when a new syndrome request is not notified any more, the shared key generating unit 15 disposes of a part of the shared information ($m_A+m_A'$) according to error correction information made public (e.g., the information equivalent to k+t bits that is likely to have been wiretapped: $S_A+S_A'$ (see FIG. 9)). The shared key generating unit 15 generates an encryption key r always having a fixed amount of information equivalent to n−k bits (step S6). The communication apparatus on the transmission side sets this encryption key r as a shared key that is shared with the communication apparatus on the reception side.

In this way, in this embodiment, the communication apparatus repeatedly executes the error correction processing while increasing the number of rows and the number of columns of the parity check matrix under a predetermined binding condition until an error of reception data is successfully corrected completely. Since this makes it unnecessary to dispose of shared information that is generated to estimate a noise level on a communication path, it is possible to improve efficiency of generation of a shared key significantly. Moreover, it is possible to obtain an encryption key always having a fixed amount of information.

As explained above, according to the present invention, the communication apparatus corrects an error of reception data using a definite parity check matrix to dispose of a part of shared information according to error correction information made public. Consequently, parities are not exchanged an extremely large number of times to specify and correct error bits. Thus, there is an effect that it is possible to reduce time required for error correction processing significantly. In addition, since a part of shared information is disposed of according to the information made public, it is possible to generate a common key, security of which is highly guaranteed. The communication apparatus repeatedly executes error correction processing while increasing the number of rows of a parity check matrix under a predetermined binding condition until an error of reception data is successfully corrected completely. Since this makes it unnecessary to dispose of generated shared information to estimate a noise level on a communication path, there is an effect that it is possible to improve efficiency of generation of a shared key significantly.

INDUSTRIAL APPLICABILITY

As described above, the quantum key distribution method and the communication apparatus according to the present invention are useful as a technology for generating a common key, security of which is highly guaranteed. In particular, the quantum key distribution method and the communication apparatus are suitable for communication on a transmission path on which a wiretapper is likely to be present.

The invention claimed is:

1. A method of distributing a quantum key from a transmitting device to a receiving device by adopting, as the quantum key, a result of estimating transmission data by correcting an error in reception data with probability information obtained by measuring photons on a quantum communication path, the method comprising:

first generating including the transmitting device and the receiving device generating a first parity-check matrix separately;

first notifying including the transmitting device notifying the receiving device of first error-correction information generated based on the first parity-check matrix and transmission data, through a public communication path;

first correcting including the receiving device correcting an error in reception data based on the first error-correction information;

second generating including the transmitting device and the receiving device generating, when the error in the reception data is not successfully corrected, second parity-check matrix separately so that a second error-correction information generated based on the second parity-check matrix and the transmission data includes the first error-correction information;

second notifying including the transmitting device notifying the receiving device of the second error-correction information through the public communication path;

second correcting including the receiving device correcting an error in the reception data based on the first error-correction information and the second error-correction information; and disposing including the transmitting device and the receiving device disposing, when the error in the reception data is successfully corrected, a part of the transmission data and a part of the reception data with the error corrected, respectively, according to an amount of the first error-correction information or the second error-correction information.

2. The method according to claim 1, wherein
the second parity-check matrix does not include the first parity-check matrix,
number of columns of the second parity-check matrix is equal to number of columns of the first parity-check matrix, and
number of rows of the second parity-check matrix is larger than number of rows of the first parity-check matrix.

3. The method according to claim 1, wherein
the second parity-check matrix and the first parity-check matrix are linearly independent,
the second parity-check matrix includes the first parity-check matrix,
number of columns of the second parity-check matrix is equal to number of columns of the first parity-check matrix, and
number of rows of the second parity-check matrix is larger than number of rows of the first parity-check matrix.

4. The method according to claim 1, wherein
the second parity-check matrix and the first parity-check matrix are linearly independent,
the second parity-check matrix includes the first parity-check matrix,
number of columns of the second parity-check matrix is larger than number of columns of the first parity-check matrix by a predetermined number of columns,
number of rows of the second parity-check matrix is larger than number of rows of the first parity-check matrix, and
the second error-correction information is generated based on the second parity-check matrix, the transmission data, and additional transmission data corresponding to the predetermined number of columns of the second parity-check matrix.

5. A receiving device that receives a quantum key from a transmitting device by adopting, as the quantum key, a result of estimating transmission data by correcting an error in reception data with probability information obtained by measuring photons on a quantum communication path, the receiving device comprising:

a first decoding unit that generates a first parity-check matrix that is identical with a first parity-check matrix generated by the transmitting device, and corrects an error in reception data based on a first error-correction information that is generated by the transmitting device based on the first parity-check matrix and transmission data and transmitted from the transmitting device through a public communication path;

a second decoding unit that generates, when the error in the reception data is not successfully corrected, a second parity-check matrix that is identical with a second parity-check matrix generated by the transmitting device so that a second error-correction information generated based on the second parity-check matrix and the transmission data includes the first error-correction information, and corrects the error in the reception data based on the first error-correction information and the second error-correction information; and a disposing unit that disposes, when the error in the reception data is successfully corrected, a part of the reception data with the error corrected according to an amount of the first error-correction information or the second error-correction information.

6. A transmitting device that transmits a quantum key to a receiving device that adopts, as the quantum key, a result of estimating transmission data by correcting an error in reception data with probability information obtained by measuring photons on a quantum communication path, the transmitting device comprising:

a first-error-correction-information-generating unit that generates first error-correction information based on a first parity-check matrix generated in advance and transmission data, and notifies the receiving device of the first error-correction information through a public communication path;

a second-error-correction-information-generating unit that generates, when an error in reception data is not successfully corrected by the receiving device, generates a second parity-check matrix so that a second error-correction information generated based on the second parity-check matrix and the transmission data includes the first error-correction information, and notifies the receiving device of the second error-correction information through the public communication path; and an encryption key generating unit that disposes, when the error in the reception data is successfully corrected, a part of the transmission data according to an amount of the first error-correction information and the second error-correction information.

* * * * *